(12) United States Patent
Mehra et al.

(10) Patent No.: US 8,386,703 B2
(45) Date of Patent: Feb. 26, 2013

(54) CONTROL SYSTEM FOR STORAGE MEANS

(75) Inventors: Rahul Mehra, Leeds (GB); Brendan Lynskey, Rotherham (GB)

(73) Assignee: Pace PLC, Shipley (GB)

( * ) Notice: Subject to any disclaimer, the term of this patent is extended or adjusted under 35 U.S.C. 154(b) by 2046 days.

(21) Appl. No.: 09/802,021

(22) Filed: Mar. 8, 2001

(65) Prior Publication Data
US 2001/0021961 A1    Sep. 13, 2001

(30) Foreign Application Priority Data

Mar. 9, 2000   (GB) .................................. 0005542.6

(51) Int. Cl.
*G06F 13/00*   (2006.01)
(52) U.S. Cl. .......................................... 711/112; 710/62
(58) Field of Classification Search .................. 386/116, 386/124, 99, 97, 95, 104, 125, 126; 725/46, 725/58
See application file for complete search history.

(56) References Cited

U.S. PATENT DOCUMENTS

| 4,166,289 A * | 8/1979 | Murtha et al. .................. 710/33 |
| 4,494,196 A * | 1/1985 | Greer ............................ 713/600 |
| 5,371,551 A * | 12/1994 | Logan et al. .................. 348/571 |
| 5,740,466 A * | 4/1998 | Geldman et al. .................. 710/5 |
| 5,754,651 A * | 5/1998 | Blatter et al. .................. 380/241 |
| 5,955,155 A * | 9/1999 | Yamamoto et al. ........... 427/577 |
| 5,995,155 A * | 11/1999 | Schindler et al. ............. 348/461 |
| 6,233,389 B1 * | 5/2001 | Barton et al. .................... 386/46 |
| 6,237,079 B1 * | 5/2001 | Stoney ............................ 712/34 |
| 2006/0292292 A1 * | 12/2006 | Brightman et al. ............. 427/66 |

FOREIGN PATENT DOCUMENTS

WO    WO00/07368    2/2000

OTHER PUBLICATIONS

IBM Technical Disclosure Bulletin, vol. 37 No. 12 Dec. 1994.

* cited by examiner

*Primary Examiner* — Thai Tran
*Assistant Examiner* — Sunghyoun Park
(74) *Attorney, Agent, or Firm* — Head, Johnson & Kachigian, P.C.

(57) ABSTRACT

Means which allows the storage and subsequent retrieval of data on a storage means such as, for example, a storage means in the form of, and known as, a hard disk drive. The storage of data is in the form of video, audio and/or auxiliary data transmitted from a remote location and received by receiver apparatus for the processing and subsequent generation of video, audio, and/or auxiliary data via a television screen connected to or including the receiver. In some instances the data is not decoded and displayed immediately, and the decoding and/or the display of the data, when it does occur may be obtained from the storage means. The control system of the storage means includes a First In First Out (FIFO) buffer which in conjunction with a Central Processing Unit (CPU) controls the generation of the control signals and the storage of the incoming data.

13 Claims, 2 Drawing Sheets

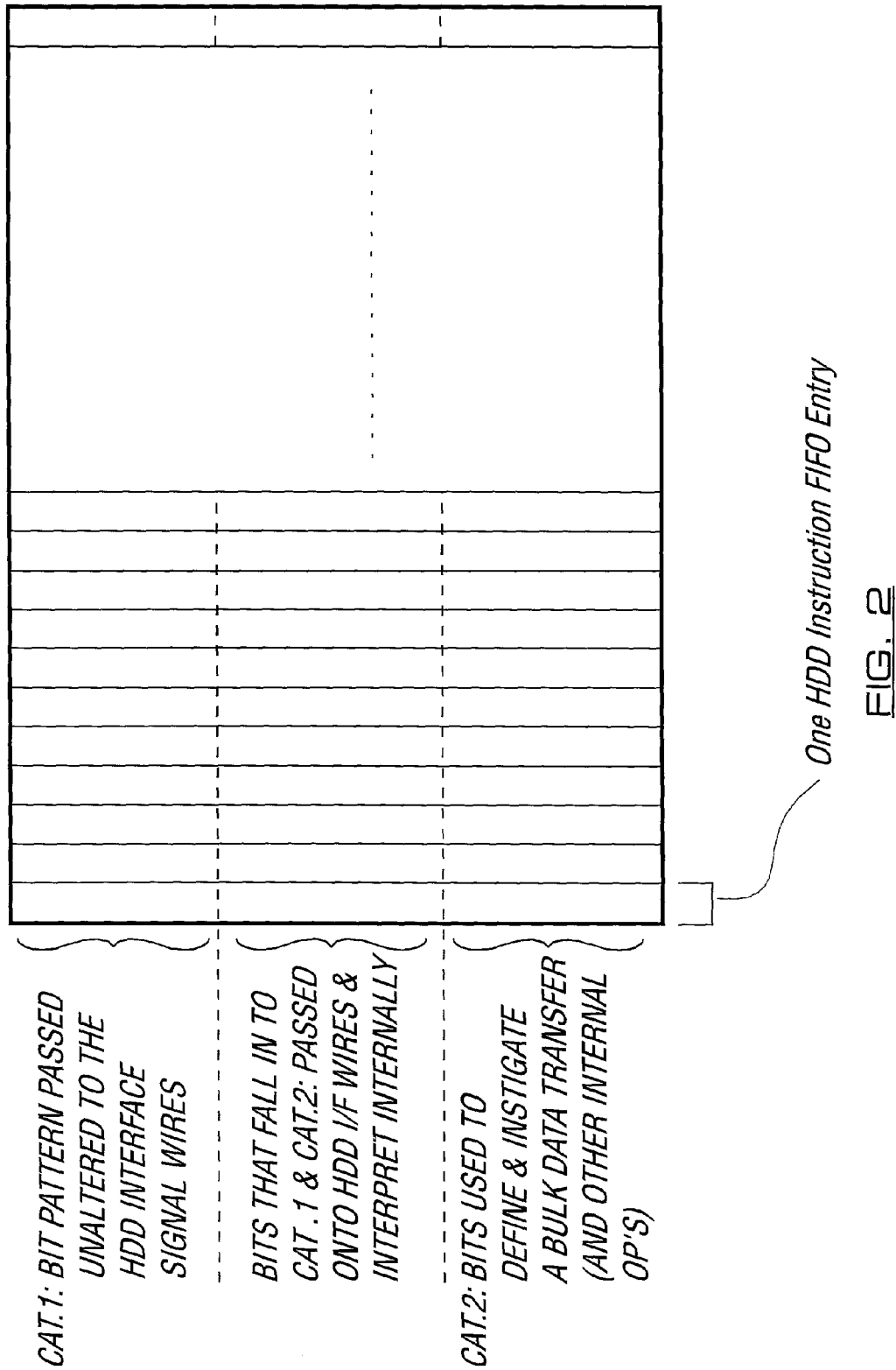

CONTROL SYSTEM FOR STORAGE MEANS

CROSS-REFERENCE TO RELATED APPLICATIONS

This application claims priority to GB Application No. 0005542.6 filed 9 Mar. 2000.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

BACKGROUND OF THE INVENTION

The invention to which this application relates is the provision of a system and control means which allows the storage and subsequent retrieval of data on a storage means such as, for example, a storage means in the form of, and known as, a hard disk drive. Furthermore the invention is related to the storage of data in the form of video, audio and/or auxiliary data which is transmitted from a remote location and received by receiver apparatus for the processing and subsequent generation of video, audio, and/or auxiliary data such as via a television screen connected to or including the receiver. In some instances the data is not decoded and displayed immediately and the decoding and/or the display of the data, when it does occur may be distant from the receiving and memory apparatus.

The receiver is typically provided in a location of a premises and is connected to a television set to allow received data to be processed and used to generate any, or any combination of television programmes, teletext and/or television programme guides.

In the most recent receivers for digital data there is provided a fixed memory device as part thereof such as a hard disk drive (HDD). The use of the storage means allows the data which is received to be stored and/or immediately used to generate a display or service and the selection to store the data is usually made as a result of user instructions to the apparatus or instructions from the service provider.

The volume of data represented by this video, audio and/or data is relatively large and, as a result, it can be difficult for manufacturers of the receivers to use the current international control standards for the storage and retrieval of data in this format, while at the same time ensuring that, as much as possible, the system for storage and retrieval of the data is efficient and performed in a timely manner even though the volume of data is relatively high.

Conventionally, many individual register read and write functions are required to be performed in order to transfer relatively small amounts of data at a time. This means that the transfer of data of the volume with which the application is concerned, can cause the control system for the same to be unwieldy and furthermore, as the data received is changing and is required to be stored in real time, the control of this can also be difficult. Thus the aim of the invention is to provide a flexible, scalable mechanism that allows efficient data transfer using the current international standard and future international standards.

In fact at the present time, the procedure for storing the data requires that the streaming of the data into the storage means utilizes six steps of protocol which are as follows:
1. 4 register writes to set the Logical Block Address (LBA) on the hard disk drive (HDD), which is the storage means.
2. 1 register write to indicate the 128KB transfer size (this is the maximum in accordance with the standard Advanced Technology Attachment (ATA).
3. 1 register write to command that bulk data be read or written from/to the HDD.
4. The HDD status register is repeatedly polled until the HDD is ready to commence the transfer.
5. Several signals are monitored during data transfer, also the HDD or host may "hold-off" (delay) the transfer of bytes during the transfer.
6. At the end of the transfer a check-sum is generated and compared to check the integrity of the data that has been transferred.

BRIEF SUMMARY OF THE INVENTION

These six steps are currently required to be repeated for each 128 Kbytes of data to be stored in the memory.

One aim of the present invention is to reduce the number of steps required to store data in a storage means while at the same time utilizing existing storage means control systems. Furthermore, although reference is made herein storage means in the form of hard disk drives (HDD) it should be appreciated that the invention is equally applicable to any Advanced Technology Attachment (ATA) or Advanced Technology Attachment Packet Interface (ATAPI) compatible device including Compact Disk Read Only Memory (CD-ROM), Digital Versatile Disk (DVD), tapes and the like and should be interpreted as such.

In accordance with a first aspect of the invention there is provided a receiver for digital data which is broadcast from a remote location, said receiver including or connected to a storage means which allows the selective storage of received data therein and a control system for the control of the storage means and the storage of data therein and wherein the system includes a "first in first out" buffer (FIFO) which includes commands for the control system and the control of the storage of the data in the storage means.

Preferably the data which forms the data to be stored comprises instruction data and block data and the paths for said data are decoupled. Preferably the data generated for the FIFO is compatible with the commands that are used to automate the bulk transfer of the data to and from the storage means.

Typically, the analysis, storage and directing of the incoming data into the receiver is performed by a control processing unit (CPU) in the receiver. The receiver controls the data which is coming in and then determines which of the data is to be stored and generates the signals for control of the FIFO.

In one embodiment the CPU loads the command signals data into the FIFO. The data can include data which is in the same form as it is received by the receiver, and/or data which is altered by the CPU and/or data generated by the CPU. Typical usage is that the CPU generates command signals and puts them into the FIFO. These command signals then instruct the transfer of data to/from the HDD via "Bulk Data Transfer Paths". In one embodiment, the command signals in the FIFO act to alter the start time for the storage of portions of incoming data and/or allows a combined set of command signals to be generated for a larger portion of data than is conventionally the case and, at the same time, reducing the number of steps required to be followed to allow the storage of the data in the storage means.

In one embodiment the provision of each instruction in the FIFO in a generic form allows any possible register read/write command to be sent from/to the attached storage means. Typically, any additional information which is not used to provide the register read/write commands to the HDD is used to instigate the automated bulk transfer of the streamed data to the storage means.

Thus in accordance with the invention there is provided a receiver which includes or is connected to storage means for the storage of data which is stored is received from a remote location and broadcast to the receiver via any of satellite, terrestrial or cable broadcast systems and which data represents a plurality of user selectable video/audio channels and for which the data is required to be combined and processed in accordance with the user selection made to generate a particular channel to be watched via the receiver and a display screen connected therewith and wherein some or all of said data is selected to be stored in the storage means rather than being displayed at that instant.

BRIEF DESCRIPTION OF THE DRAWINGS

A specific embodiment of the invention is now described with reference to the accompanying drawings wherein;

FIGS. 1 and 2 illustrate embodiments of bulk data transfer paths and the storage means instruction FIFO respectively in accordance with the invention.

DETAILED DESCRIPTION OF THE INVENTION

Figure 1:
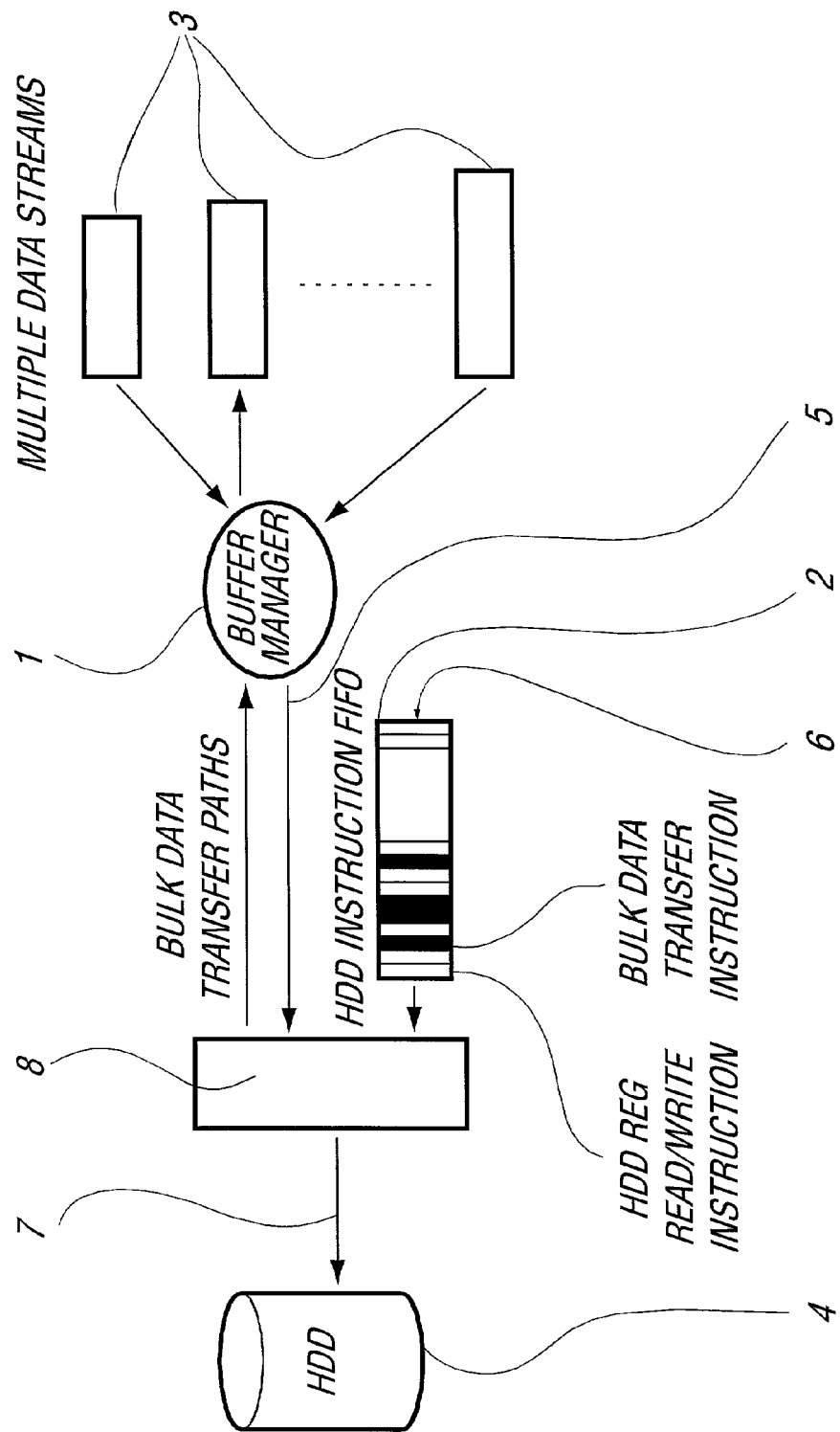

Referring now to the Figures they relate to a receiver with or connected to a storage means for the selective storage of data therein. The data is received by being broadcast from a remote location to the receiver via any of satellite, cable or terrestrial transmission systems. When a user of the receiver makes a selection to watch a particular channel, the appropriate video, audio and/or auxiliary data from the streams of received data is identified, processed and combined to allow the generation of the selected channel via a display screen and speakers connected with the receiver. In some instance however, the channel may not be selected for viewing immediately but rather is selected to be stored in a storage means for subsequent selection and viewing at a later date. It is to the management of the storage of the data that this invention relates.

In accordance with the example herein described the data or storage space required during the bulk data transfer operation is provided by a management system 1. The management system can be controlled independently such that data for multiple data streams 3 can be multiplexed into a single stream 5.

The single FIFO 2 of storage means instructions allows the automation of the hardware synchronisation of the storage means and transfer means in terms of the same transferring the data and doing so with the correct timing. Instructions are removed from the FIFO 2 and presented to the HDD 4 control lines 7 using the correct timings by an instruction sequencing system 8. The CPU 6 inserts new (groups of) instructions into the input of the FIFO 2.

In practice, the presentation of the instructions from the FIFO to the HDD can be sent at the maximum possible rate of transmission and in practice will be limited only by the operation of the HDD.

The provision of each instruction in the FIFO 2 in a generic form allows any possible register read/write command to be sent from/to the attached ATA or ATAPI compatible device (i.e. HDD) and the additional information which is not used to provide the register read/write accesses to the HDD can be used to instigate the automated bulk transfer of the streamed data.

The provision of a single FIFO of generic HDD register read/write commands allows the same to be freely intermixed with commands that automate the bulk transfer of data to/from the ATA/ATAPI bus. More over, the data required during the bulk data transfer operation can, itself, be a multiplex of many data streams.

A mechanism that supports streaming Audio Visual (AV) data from/to a standard ATA-5 HDD is provided which again is generic and allows the use of newer HDD and other ATA or ATAPI compatible devices (including DVD).

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

The invention claimed is:

1. A receiver for digital data broadcast from a remote location, said receiver comprising:
    a storage means for the selective storage of digital data broadcast from a remote location therein, the data to be stored including instruction data, block data, and paths for the data being decoupled;
    a control system for control of the storage means and control of storage of data therein, the control system including a single storage-instruction "first in first out" buffer being capable of receiving instructions in a generic form;
    a control processing unit for analyzing the digital data to determine when it should be stored;
    said control processing unit inserting instructions in generic form into the single storage-instruction "first in first out" buffer;
    said instructions comprising:
    (a) register read and write commands in a generic form for the control of storage of the digital data in the storage means;
    (b) control system commands for automating the bulk transfer of said digital data to and from said storage means; and
    wherein within the single storage-instruction first-in-first-out buffer the control commands for automating the bulk transfer of the digital data from the control system are compatible and intermixable with the register read and write commands.

2. The receiver according to claim 1 wherein the analysis, storage and directing of the incoming data into said receiver is performed by a control processing unit in said receiver.

3. A receiver according to claim 2 wherein the control processing unit loads the command signals data into said first in first out buffer which can include data which is in the same form as it is received by any from the group consisting of said receiver, and data which is altered by said computer processing unit and data generated by said computer processing unit.

4. A receiver according to claim 3 wherein said control processing unit generates the command signals which instruct the transfer of data to and/or from said data storage means.

5. A receiver according to claim 4 wherein said command signals in said first in first out buffer alter the start time for the storage of portions of incoming data.

6. A receiver according to claim 4 wherein said command signals in said first in first out buffer allows a combined set of command signals to be generated.

7. The receiver according to claim 1 wherein said receiver controls which of the incoming data is to be stored and generates signals for control of said first-in-first out buffer to allow storage of the appropriate data.

8. A receiver according to claim 1 wherein provision of each instruction in said first-in-first out buffer in a generic form allows any possible register read/write command to be sent from/to the attached storage means.

9. A receiver according to claim 8 wherein said storage means is an advanced technology attachment compatible device.

10. A receiver according to claim 9 wherein any additional information which is not used to provide the register read/write commands to the hard disk drive is used to instigate the automated bulk transfer of the streamed data to said storage means.

11. A receiver according to claim 8 wherein said storage means is an advanced technology attachment pack interface compatible device.

12. The receiver according to claim 1 wherein said receiver is connected to a storage means which allows selective storage of received data therein.

13. A receiver according to claim 1 wherein the data required during said bulk transfer is a multiplex of many data streams.

* * * * *